United States Patent
Liao et al.

(10) Patent No.: US 7,188,014 B1
(45) Date of Patent: Mar. 6, 2007

(54) ASSISTANT MONITOR APPARATUS AND THE METHOD OF CONTROLLING THE SAME

(75) Inventors: Yung-Sheng Liao, Zhonghe (TW); Wen-Ching Tu, Taipei (TW)

(73) Assignee: Industrial Technology Research Institute, Chutung Hsinchu (TW)

( * ) Notice: Subject to any disclaimer, the term of this patent is extended or adjusted under 35 U.S.C. 154(b) by 0 days.

(21) Appl. No.: 11/433,619

(22) Filed: May 15, 2006

(30) Foreign Application Priority Data

Jan. 9, 2006 (TW) .............................. 95100761 A

(51) Int. Cl.
*G06F 7/00* (2006.01)
*G05D 1/00* (2006.01)

(52) U.S. Cl. ...................................... 701/49; 362/494

(58) Field of Classification Search .................... 701/4, 701/1, 49, 41, 70, 72, 96, 301; 340/436, 340/475; 362/494, 513, 523; 116/54; 359/872; 342/70

See application file for complete search history.

(56) References Cited

U.S. PATENT DOCUMENTS

| | | | |
|---|---|---|---|
| 6,685,348 B2 * | 2/2004 | Pastrick et al. | 362/494 |
| 6,804,607 B1 * | 10/2004 | Wood | 701/301 |
| 6,906,639 B2 * | 6/2005 | Lemelson et al. | 340/903 |
| 6,934,614 B2 * | 8/2005 | Yamamura et al. | 701/45 |
| 7,069,146 B2 * | 6/2006 | Yamamura et al. | 701/301 |
| 7,083,312 B2 * | 8/2006 | Pastrick et al. | 362/494 |

FOREIGN PATENT DOCUMENTS

| | | |
|---|---|---|
| TW | 564830 | 12/2003 |
| TW | 580644 | 3/2004 |
| TW | 588004 | 5/2004 |

* cited by examiner

*Primary Examiner*—Richard M. Camby
(74) *Attorney, Agent, or Firm*—Troxell Law Office PLLC

(57) ABSTRACT

The present invention relates to an assistant monitor method for vehicle, comprising steps of: projecting a light beam to illuminate objects surrounding a transportation means; receiving the reflected light of the light beam so as to generate an electric image signal accordingly; generating a status signal by detecting and sensing the status of the transportation means; processing the status signal so as to correspondingly generate a control signal; and adjusting the projecting angle of the light beam and the receiving angle to receive the reflected light beam according to the control signal. Moreover, according to the method, the present invention also provides an assistant monitor apparatus of for vehicle to implement the foregoing method. By means of the aforesaid apparatus provided in the present invention, the projecting direction of the light projector and a sensing angle of the image sensor for receiving the reflected light can be controlled to reduce blind spots of a rear mirror of the transportation means while avoiding the whitening effect to be generated on the rear mirror, such that safety of the driver driving the transportation mean along with the ambient vehicles and pedestrians can be ensured.

20 Claims, 7 Drawing Sheets

ASSISTANT MONITOR APPARATUS AND THE METHOD OF CONTROLLING THE SAME

FIELD OF THE INVENTION

The present invention relates to a monitor apparatus and method, and more particularly, to a assistant monitor apparatus and method for vehicle, that is capable of projecting a light beam to illuminate ambient environment of a transportation means for detecting statuses of the transportation mean relating to its ambient environment while displaying the detection on a display device of the transportation means, and further controlling the projection direction of the light beam as well as the reception angle of the reflected light of the light beam so as to reduce blind spots the transportation means while avoiding the whitening effect to be generated.

BACKGROUND OF THE INVENTION

The invention of motor vehicle can be treated as a milestone of our civilization, since not only it has shorten the distance for people traveling between two locations, but the progressing of motor vehicle also promote the development of industry. As the progress of technology, the making of motor vehicle is evolving day by day. However, there are still some parts of a motor vehicle are still not changed with the innovation of technology, one of which is the automobile rear mirror.

Rear mirror is a functional type of mirror found on automobiles and other motor vehicles, designed to allow the driver to see the areas that cannot be seen while looking forward, i.e. those areas behind the vehicle as well as the left- and right-hand sides of the vehicle. However, most convention rear mirrors have shortcomings listed as following:

(1) Fixed visual angle: Typically, a conventional rear mirror is a flat mirror affixed to a specific location of a motor vehicle on a swivel mount allowing it to be freely rotated. However, once a rear mirror is set, it can only provide the driver with a fixed visual angle that can not be changed dynamically as it is needed, such as negotiating a curve or parking.

(2) Inferior night vision: A conventional rear mirror can only function well under the condition of good visibility. It is known that conventional rear mirrors can not provide good images at nighttime or while driving in heavy mist.

(3) Easy to be damaged: Since most conventional rear mirrors are arranged extruding out the body of the motor vehicle, it is vulnerable to impacts and collisions, even though they are equipped with fold-away feature.

In view of aforesaid shortcomings, there are many attempts trying to improve the operation of rear mirrors for motor vehicles. One of which is an image monitor system for automobiles disclosed in T.W. Pat. No. 564830. The image monitor system uses an image capturing device, either arranged at the interior or exterior of an automobile, to fetch images and generate image signals accordingly, while utilizing an organic light emitting device to display the fetched image signals. Although the aforesaid system can be used to capture images behind the automobile for allowing the driver to see the areas that cannot be seen while looking forward, it is effective only at day time since the image caturing device, being the only means available to the image system for fetching images, can not function well under poor visibility, especially at night time.

Another such attempt is an automobile camera surveillance apparatus disclosed in T.W. Pat. No. 580644, in which a infrared camera is used to cooperate with an infrared emitter for enabling the automobile camera surveillance apparatus to acquire good quality images during day time and night time while utilizing an infrared sensor to avoid the whitening effect. Although the aforesaid apparatus can provide good quality images no matter at day time or night time, there are still blind spots exist since the infrared emitter is fixed to illuminate the surrounding of the automobile with a specific angle that it can only provide the driver with a fixed visual angle and can not be changed as it is needed, such as negotiating a curve while backing. In addition, the aforesaid apparatus uses an image delay method to overcome the whitening effect that it is prone to cause the interrupt of image signals and thus have adverse effect on the judgment of the driver.

One further such attempt is an automobile monitor apparatus with automatic visual angle adjustment ability, disclosed in T.W. Pat. No. 588004, which is an apparatus enabling a rear mirror to be adjusted automatically and dynamically. The aforesaid automobile monitor apparatus uses a sensor to detect the turning of the automobile while enabling the rear mirror to rotate automatically according to the detection. Although he aforesaid apparatus can adjust its visual angle automatically, it is lacking of night vision ability that it can not function well during night time or at poor visibility.

Therefore, it is in need of an assistant monitor method and apparatus capable of overcoming the shortcomings of prior arts.

SUMMARY OF THE INVENTION

The primary object of the present invention is to provide an assistant monitor apparatus for a vehicle, capable of projecting invisible light to illuminate the ambient of the vehicle and thus generating images of its ambient environment for enabling the driver to identify obstacles no matter at day time or night time.

It is another object of the invention to provide an assistant monitor apparatus for a vehicle, which is equipped with a control method capable of detecting the moving direction of the vehicle while controlling the projection angle of an invisible light to change according to the detection, so that the safety of the driver driving the vehicle along with the ambient vehicles and pedestrians are ensured.

Further, another object of the invention to provide an assistant monitor apparatus for a vehicle, which is equipped with a control method capable of detecting the speed of the vehicle while controlling the projection angle of an invisible light and the visual angle of an image sensor according to change according to the detection, i.e. the field of vision is enlarged/shrunk with the speed change of the vehicle.

Yet, another object of the invention to provide an assistant monitor apparatus for a vehicle, which is equipped with a control method capable of detecting the ambient environment of the vehicle using an infrared signal while altering the visual angle of an image sensor according to the detection, or performing a means of signal process upon the result of the detection for adjusting the gain of the image sensor, such that the whitening effect is eliminated.

To achieve the above objects, the present invention provide an assistant monitor method for vehicles, comprising steps of: projecting a light beam to illuminate objects surrounding a transportation means; receiving the reflected light of the light beam so as to generate an image-related signal accordingly; generating a status signal by performing a detection operation to sense the status of the transportation means; processing the status signal so as to correspondingly generate a control signal; and adjusting the projecting angle and intensity of the light beam and the angle of reception for receiving the reflection of the light beam according to the control signal.

Preferably, the detection operation further comprises a step of: detecting a moving condition of the transportation means. Wherein, the moving condition can be a status selected from the group consisting of a turning of the transportation means, moving direction of the transportation means, speed of the transportation means, and the combination thereof.

Preferably, the detection operation further comprises a step of: detecting of the ambient luminance of the transportation means.

Preferably, the assistant monitor method for vehicles further comprises a step of: detecting statuses of invisible light illuminating the ambient of the transportation means while using the result of the detection as a basis for evaluating the influence of whitening effect and thus adjusting the gain of the image signal accordingly.

Preferably, the assistant monitor method for vehicles further comprises steps of: processing the image-related signal to generate an image signal; and enabling a display device to receive the image signal for displaying images thereon accordingly.

Furthermore, to achieve the above objects, the present invention provide an assistant monitor apparatus, adapted for a transportation means, which comprises: at least a light emitter, each for providing a light beam; at least an image sensor, each capable of receiving the reflection of the light beams and thus generating an image-related signal accordingly; at least a sensing controller, each capable of detecting a status of the transportation means and thus generating a status signal accordingly; a servo control unit, coupled to each image sensor and each sensing controller, capable of processing the image-related signal of each image sensor to generate an image signal correspondingly while processing the status signal of each sensing controller to generate a control signal correspondingly; at least a swivel seat, coupled to the servo controller unit, capable of receiving the control signal while controlling the swivel seat to rotate according to the received control signal; and a display device, coupled to the servo controller unit, capable of receiving the image signal while display an image thereon accordingly. It is noted that the light emitter is preferred to be a light source of visible light or a source of infrared light.

Preferably, the light emitter further comprises a parabolic reflector for enabling light of the light emitter to be projected parallelly.

Preferably, the light emitter further comprises a scattering screen for enabling the light of the light emitter to be projected homogeneously.

Preferably, the light emitter is arranged at a location selected form the group consisting of: the front, the left front side, the right front side, the rear and the top of the transportation means.

Preferably, the image sensor can be a visible light sensor, an infrared light sensor, a sensor capable sensing visible light and infrared light, or a device integrating a visible light sensor and an infrared light sensor.

Preferably, the image sensor is arranged at a location selected form the group consisting of: the front, the left front side, the right front side, the rear and the top of the transportation means.

Preferably, the status of the transportation means is a status selected from the group consisting of a turning of the transportation means, moving direction of the transportation means, speed of the transportation means, and the combination thereof.

Preferably, each swivel seat is at least connected to a device selected from the group consisting of the light emitters and the image sensors, while being affixed to the transportation means for enabling the device connected to the swivel seat to rotate to a direction corresponding to the status of the transportation means according to the control signal of the servo control unit.

Preferably, the sensing controller is capable of detecting a variation of the steering mechanism of the transportation means as the transportation means is turning. In a preferred embodiment, the sensing controller is an angular detector capable of detecting the rotating angle of the steering wheel of the transportation means and thus generating an angular signal accordingly while transmitting the angular signal to the servo control unit for enabling the same to generate a corresponding control signal directing the swivel seat to rotate accordingly.

Preferably, the swivel seat is arranged at a location selected form the group consisting of: the front, the left front side, the right front side, the rear and the top of the transportation means.

Preferably, the sensing controller is capable of generating a status signal according to the ambient luminance of the transportation means detected thereby, while transmitting the status signal to the servo control unit for enabling the same to generate a corresponding control signal controlling the intensity of the light projected by the light emitters.

Preferably, the transportation means is an automobile.

Preferably, at least one of the light emitters and at least one of the image sensors can be configured into a module, whereas the module can be arranged at a location selected form the group consisting of: the front, the left front side, the right front side, the rear and the top of the transportation means.

Other aspects and advantages of the present invention will become apparent from the following detailed description, taken in conjunction with the accompanying drawings, illustrating by way of example the principles of the present invention.

DESCRIPTION OF THE PREFERRED EMBODIMENT

For your esteemed members of reviewing committee to further understand and recognize the fulfilled functions and structural characteristics of the invention, several preferable embodiments cooperating with detailed description are presented as the follows.

Figure 1A:
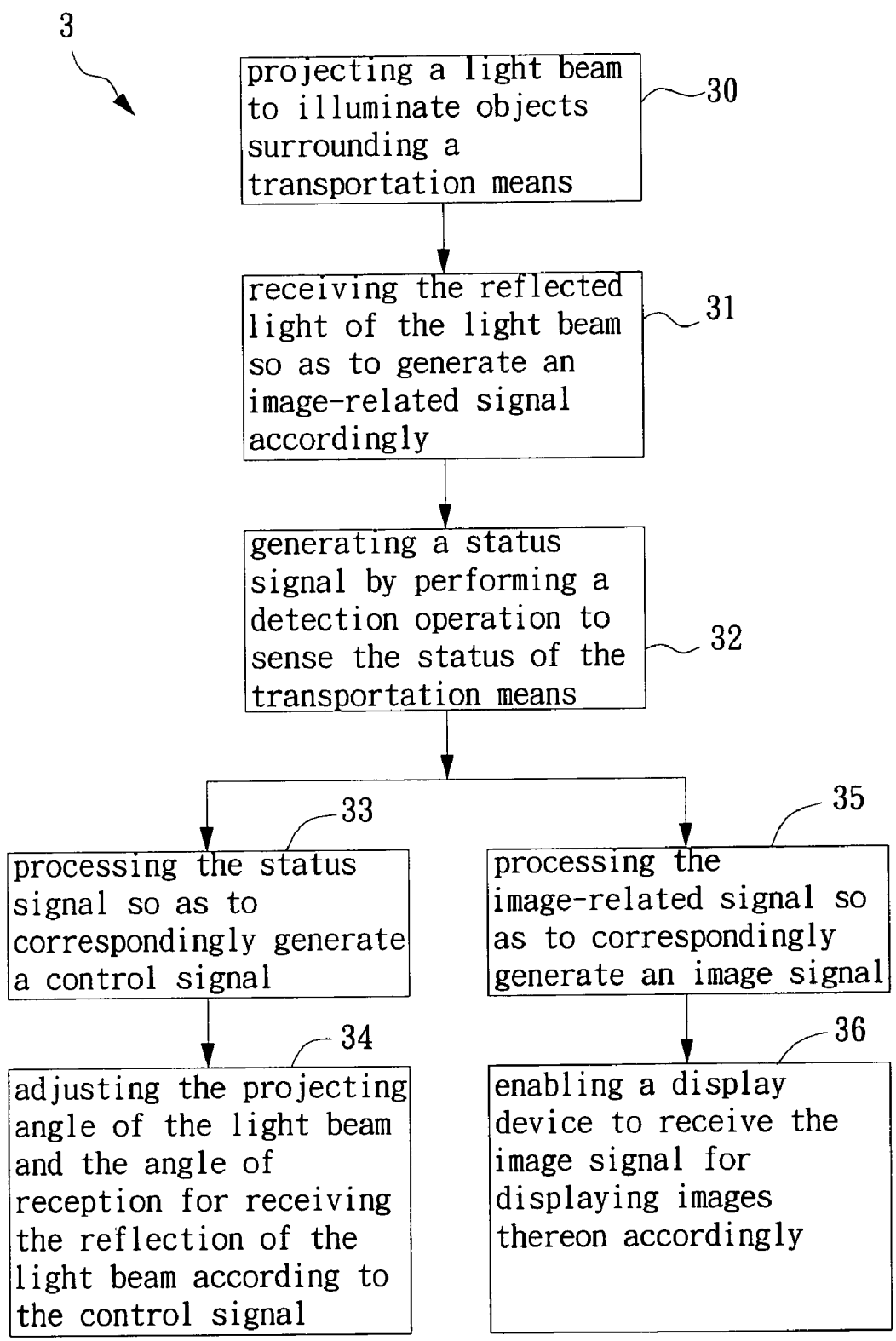
FIG. 1A is a flow chart depicting an assistant monitor method according to the present invention.

Please refer to FIG. 1A, which is a flow chart depicting an assistant monitor method according to the present invention. The assistant monitor method 3 of FIG. 1A starts at step 30. In step 30, a light beam is projected to illuminate objects surrounding a transportation means, and then the flow proceeds to step 31. it is noted that the light beam illuminating objects surrounding the transportation means is a light beam selected form the group consisting of: visible light, infrared light and the combination thereof. In step 31, the reflected light of the light beam is received so as to generate an image-related signal accordingly while the device used for receiving the reflected light of the light beam is a device selected form the group consisting of: a charge coupled device (CCD), and a complementary metal oxide semiconductor (CMOS), and then the flow proceeds to step 32.

Figure 1B:
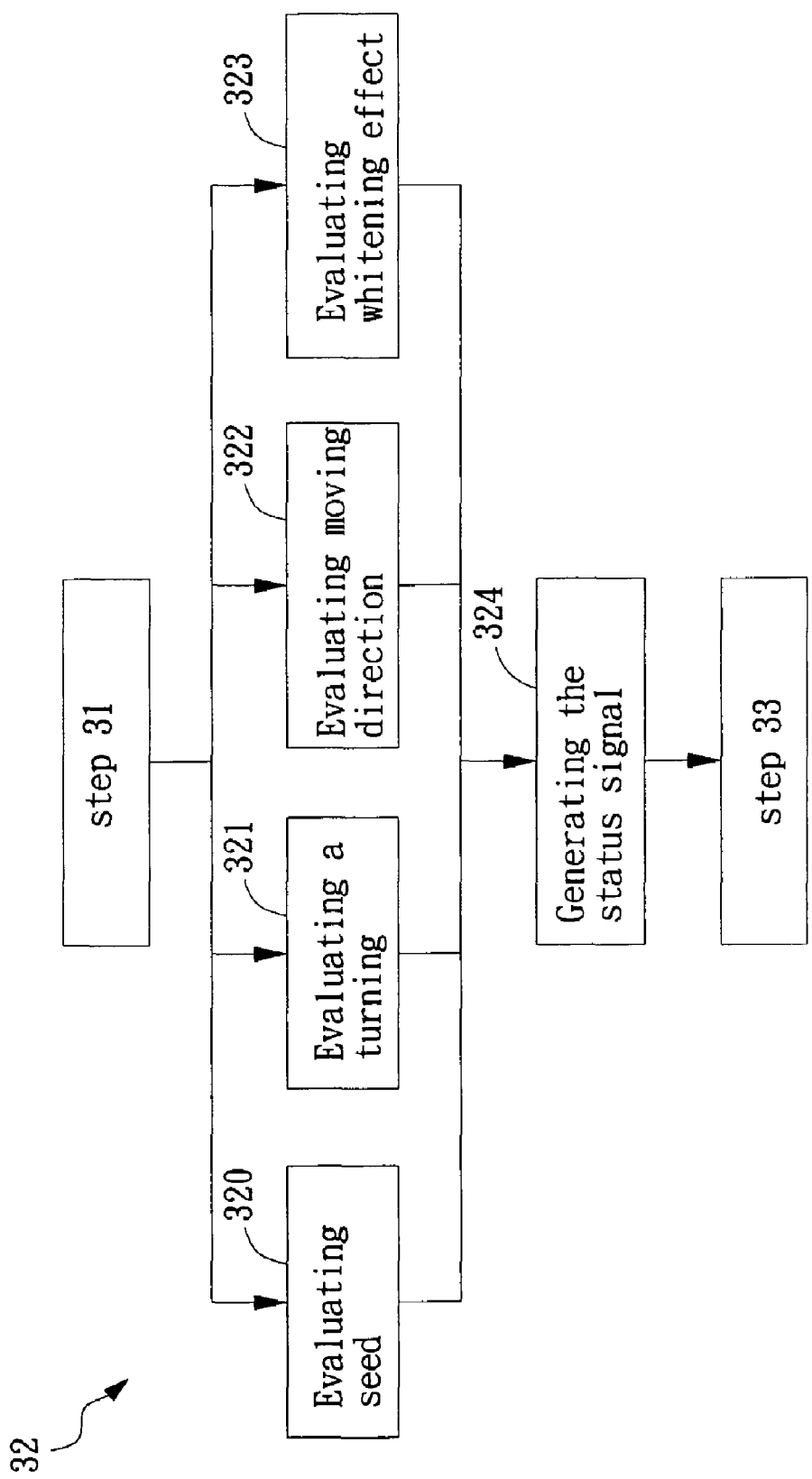
FIG. 1B is a flow chart depicting the detection operation of an assistant monitor method according to the present invention.

In step 32, a detection operation is performed to sense the status of the transportation means and thus generating a status signal accordingly, and then the flow proceeds to step 33 and step 35 simultaneously. The processing of the detection operation is illustrated in FIG. 2B, which is a flow chart depicting the detection operation of an assistant monitor method according to the present invention. The flow of a detection operation starts as soon as the step 31 of FIG. 1A is completed and proceeds to steps 320, 321, 322, 323, in which the speed, turning and moving direction of the transportation means are detected, as well as the ambient illuminance is detected by a sensor and thus the whitening effect is evaluated, as shown in FIG. 1B, and then the flow proceeds to step 324. In step 324, a status signal basing on the preceding detections is generated.

In step 33, the status signal is processed so as to correspondingly generate a control signal, and then the flow proceeds to step 34. In step 34, the projecting angle of the light beam and the angle of reception for receiving the reflection of the light beam are adjusted according to the control signal. In step 35, the image-related signal is processed so as to correspondingly generate an image signal, while adjusting the gain of the image signal with respect to the whitening effect, and then the flow proceeds to step 36. In step 36, a display device is used to receive the image signal for displaying images thereon accordingly and thus enabling the driver of the transportation means to view the ambient of the transportation means.

Moreover, the present invention also provides an assistant monitor apparatus of for vehicle to implement the foregoing method 3. Please refer to FIG. 2, which is a schematic diagram showing an assistant monitor apparatus according to a preferred embodiment of the invention. The assistant monitor apparatus 2 is adapted to be arranged on a transportation means, such as a wheeled vehicle, for monitoring the ambient of the transportation means, which is comprised of: a servo control unit 20, a projection unit 21, a plurality of swivel seats, numbered as 24, 25, a plurality of image sensor 22, a display device 23 and at least a sensing controller 26.

The projection unit 21 is electrically coupled to the servo control unit 20, which is comprised of at least a light emitter 210. Each light emitter 210 is capable of emitting invisible light, such as infrared light, or visible light, depending on requirement of actual usage. The light emitter 210 can include a parabolic reflector for enabling light of the light emitter 210 to be projected parallelly, or can include a scattering screen for enabling the light of the light emitter 210 to be projected homogeneously. In addition, the light emitter 210 is arranged at a location selected form the group consisting of: the front, the left front side, the right front side, the rear and the top of the transportation means. In this preferred embodiment, the assistant monitor apparatus has a plurality of light emitters 210, each for projecting a light beam to illuminate objects surrounding the transportation means while being reflected thereby.

Each image sensor 22 is electrically coupled to the servo control unit 20, and is capable of receiving the reflected light while generating a corresponding image-related signal to be transmitted to the servo control unit 20. The servo control unit 20 is capable of processing and converting the received image-related signal into an image signal. In a preferred aspect, each image sensor 22 is arranged at a location selected form the group consisting of: the front, the left front side, the right front side, the rear and the top of the transportation means. Moreover, the image sensor 22 can be a visible light sensor, an infrared light sensor, a sensor capable sensing visible light and infrared light, or a device integrating a visible light sensor and an infrared light sensor. In this preferred embodiment, image sensor 22 is a device selected form the group consisting of: a charge coupled device (CCD), and a complementary metal oxide semiconductor (CMOS).

The sensing controller 26 is composed of a first sensor 261 and a second sensor 262. The first sensor is electrically coupled to the servo control unit 20, and is used for detecting the speed, turning and moving direction of forwarding/backing of the transportation means while generating a corresponding status signal. In a preferred aspect, the first sensor 261 is capable of detecting a variation of the steering mechanism of the transportation means as the transportation means is turning, e.g. the first sensor 261 can be an angular detector capable of detecting the rotating angle of the steering wheel of the transportation means and thus generating an angular signal accordingly while transmitting the angular signal to the servo control unit 20 for enabling the same to generate a corresponding control signal directing the swivel seat to rotate accordingly. Furthermore, the first sensor 261 can be arranged on the wheel shaft or on the steering wheel for enabling the same to detect the rotation thereof and thus generate a corresponding rotation signal to the servo control unit 20 while enabling the servo control unit 20 to process the received rotation signal and thus direct a corresponding swivel seat to rotate according the result of the signal processing. In addition, the first sensor 261 can be enabled to detect the switching of direction signal lamp while generating a signal corresponding to the switching to be received by the servo control unit 20. Nevertheless, it is concluded that the first sensor will transmit a signal according to the detection thereof to the servo control unit 20, where the signal is process and thus converted into a first control signal and a second control signal.

The second sensor 262 is electrically coupled to the servo control unit 20, which is capable of sensing the ambient illuminance of the transportation means while generating a signal accordingly. The second sensor can be an infrared sensor, an optical sensor, or the combination of the two. In the preferred embodiment of FIG. 2, the second sensor 262 is composed of an optic sensor 2621 and a plurality of infrared sensors 2622. Wherein, the optic sensor 2621 is used to detect the ambient illuminance of the transportation means and thus generate a signal to the servo control unit 20 for enabling the same to make an evaluation according to the received signal to determine whether or not to activate a light emitter 210, or to adjust the intensity of the light emitted 210; and each infrared sensor 2622 is capable of sensing infrared light emitted from other infrared emitter, such as an infrared emitter arranged on another vehicle, and thus generating a signal accordingly while transmitting the signal to the servo control unit for enabling the same to generating a second control signal to overcome the whitening effect.

Each of the plural swivel seats 24, 25 is able to rotate as directed, which is arranged at a location selected form the group consisting of: the front, the left front side, the right front side, the rear and the top of the transportation means. In this preferred embodiment of FIG. 2, a portion of one of the plural swivel seat 24 is connected to a corresponding light emitter 210, so that the swivel seat 24 can be directed to rotate according to the first control signal and thus the projection angle of the light emitter 210 connected thereto is adjust correspondingly with respect to the first control signal representing the status of the transportation means; and a portion of t one of the plural swivel seat 25 is connected to a corresponding image sensor 22, so that the swivel seat 25 can be directed to rotate according to the second control signal and thus the reception angle of the image sensor 22 connected thereto is adjust correspondingly with respect to the second control signal.

Figure 3A:
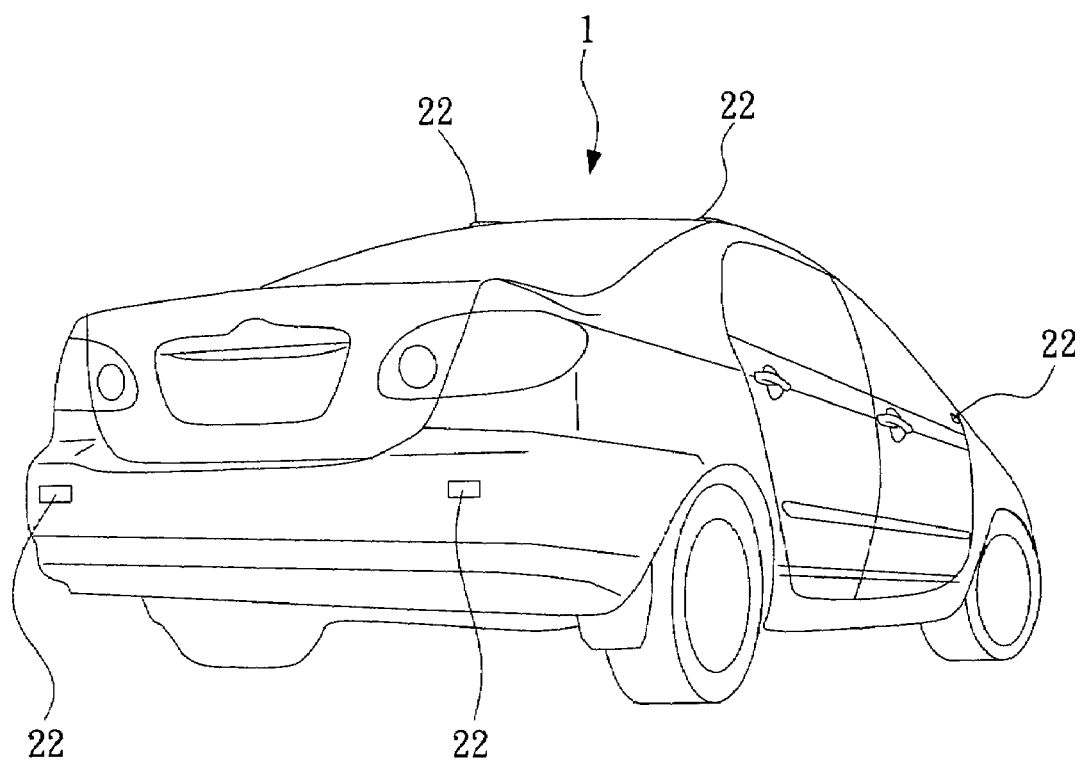
FIG. 3A is a schematic view showing an arrangement of image sensors according to the present invention.
Figure 4A:
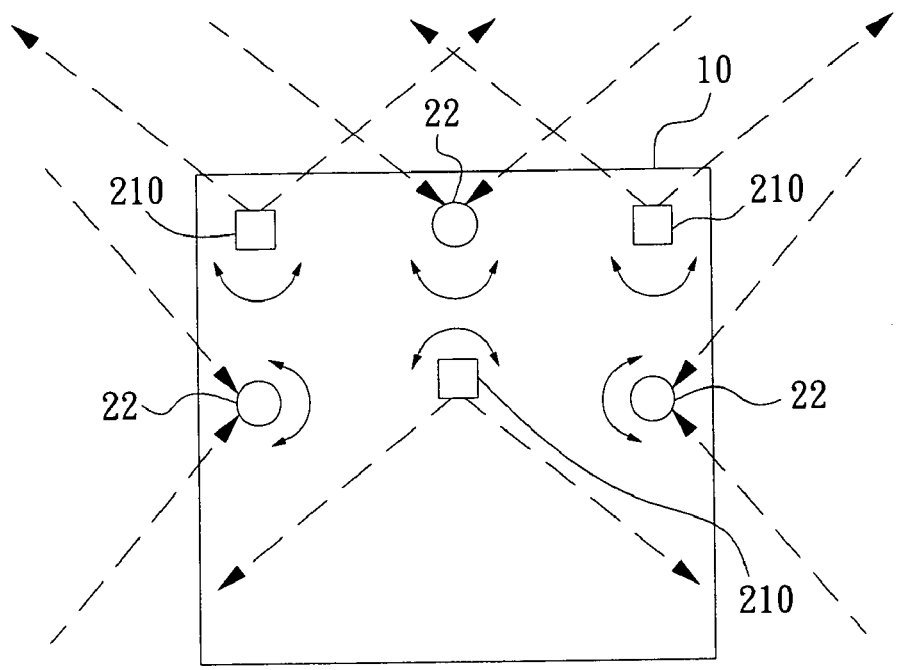
FIG. 4A is a schematic diagram showing the arrangement of light emitters and image sensors on a transportation means according to a preferred embodiment of the invention.

It is noted that the positioning of the plural image sensors 22 and the plural light emitters 210 can be arranged at will with respect to actual requirement. As seen in FIG. 4A, three light emitters 210 and three image sensors 22 are arranged on the top of a transportation means according to a preferred embodiment of the invention. Please refer to FIG. 3A, which is a schematic view showing an arrangement of image sensors on an automobile 1. In FIG. 3A, image sensors are arranged respectively on the back bumper, on the top, and at the locations of conventional side-view mirror the automobile 1, so that they can replace the functions of conventional real mirrors and thus the shortcomings of conventional rear mirror can be overcame.

Figure 3B:
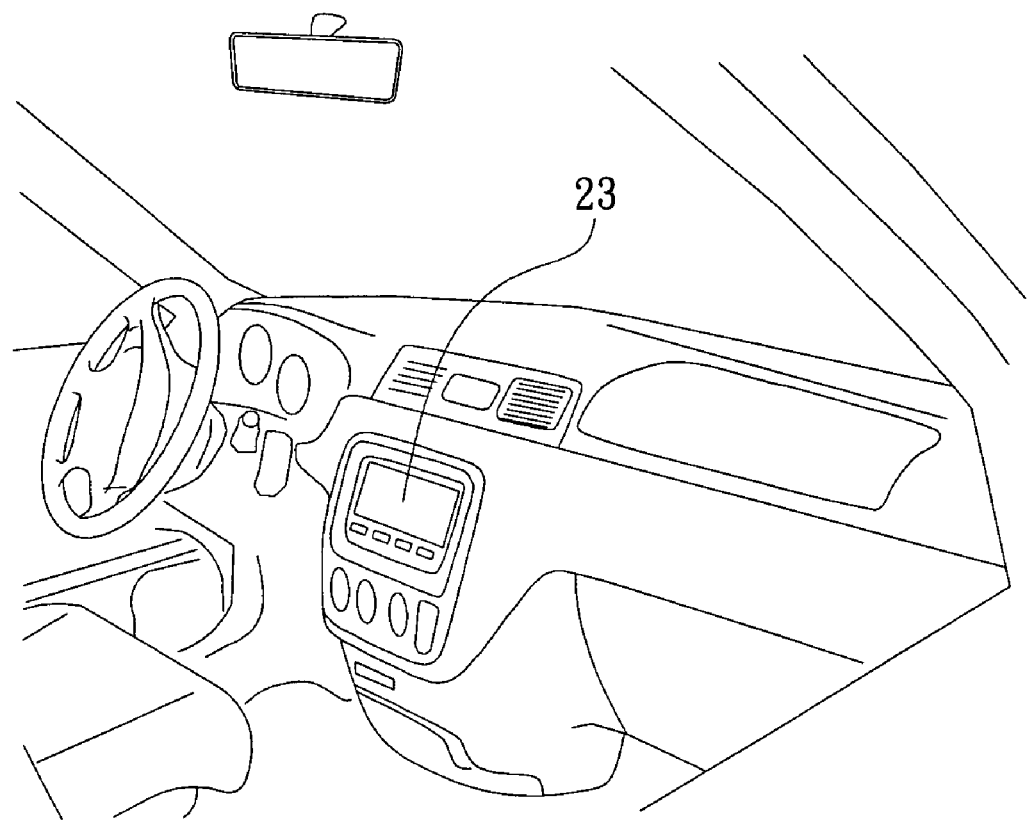
FIG. 3B is a schematic diagram showing the positioning of a display device in an automobile according to the present invention.

The display device 23 is electrically connected to the servo control unit 20, which is capable of receiving the image signal while displaying images thereon accordingly. It is noted that the display device can be arranged in the transportation means at a position in front of the driver. In the preferred embodiment shown in FIG. 3B, the display device can be a liquid crystal display, or an organic light emitting device, but is not limited thereby.

Figure 2:
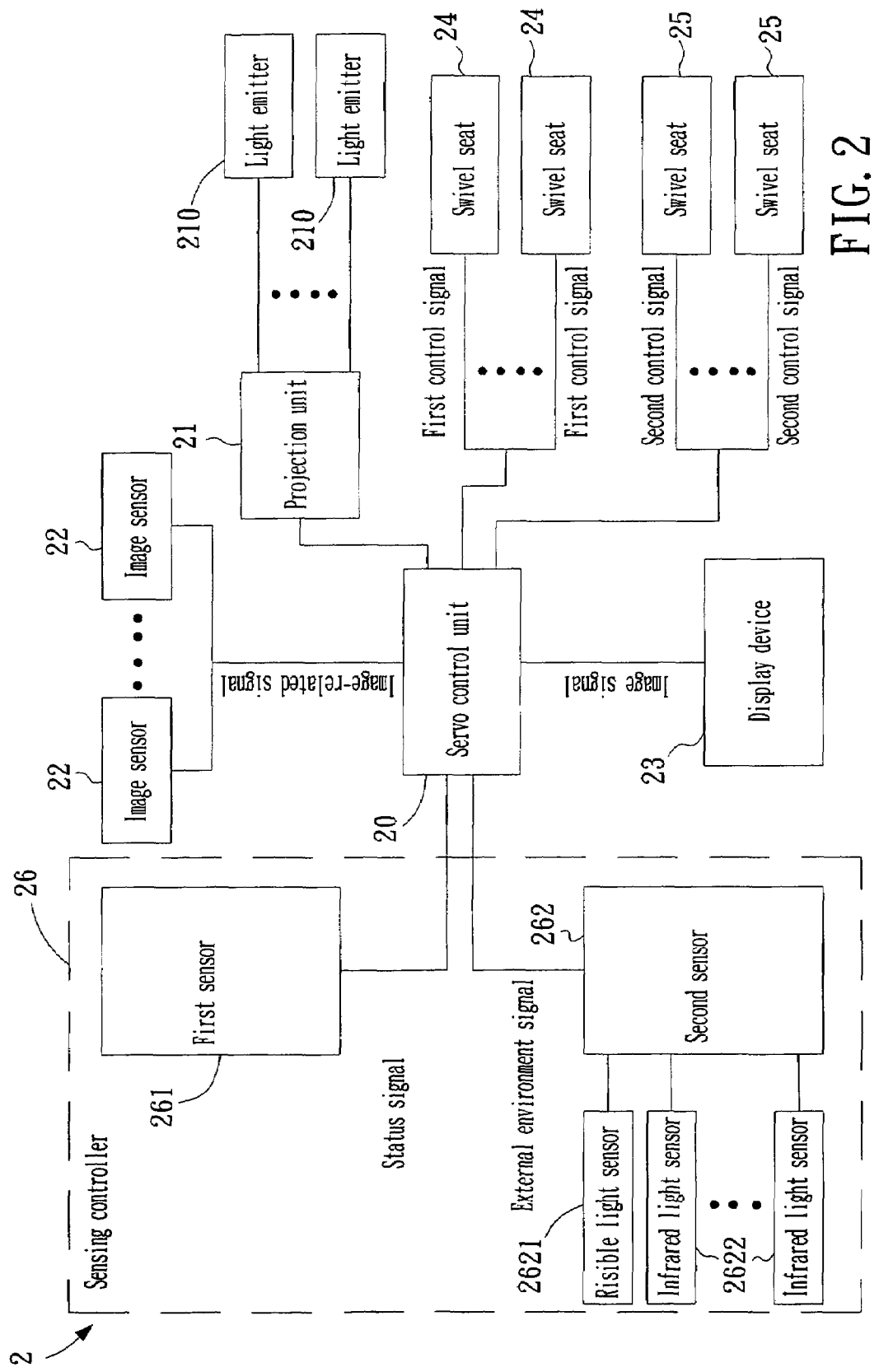
FIG. 2 is a schematic diagram showing an assistant monitor apparatus according to a preferred embodiment of the invention.

The present invention is characterized in that: by the using of the plural rotatable light emitters 210 and rotatable image sensors, the viewing angle of a driver of a transportation means can be adjusted while eliminating the whitening effect. As seen in FIG. 2 and FIG. 4A, there are three light emitters 210 and three image sensors 22 being arranged on the top 10 of an automobile. As the automobile is moving forward slowly, those light emitters 210 and image sensors 22 are orientated at a normal position. However, when the automobile is speeding up and the speeding is detected by the first sensor 261, the first sensor 261 will issue a signal to the servo control unit 20 for enabling the servo control unit to generate a first control signal directing those light emitters 210 to rotate accordingly, such that the field of vision is enlarged, as seen in FIG. 4B.

Figure 4B:
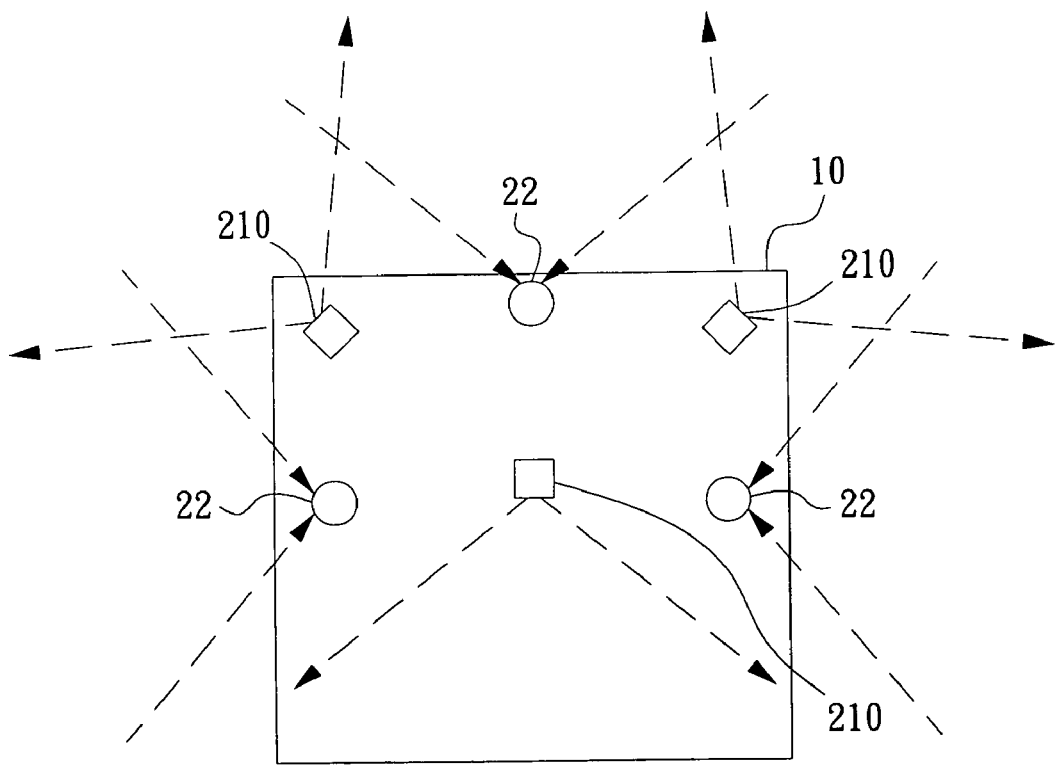
FIG. 4B shows the positioning of light emitters and image sensor as the transportation means is moving forward at high speed.
Figure 4C:
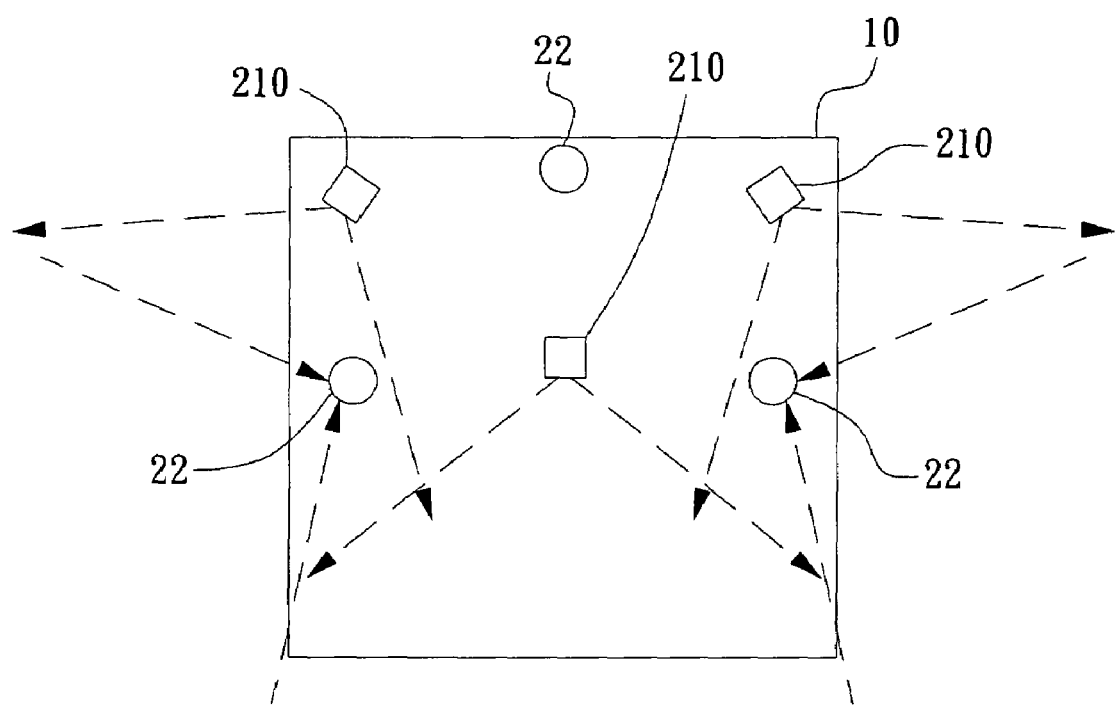
FIG. 4C shows the positioning of light emitters and image sensor as the transportation means is moving backward.

As seen in FIG. 4B where the automobile is backing, according to the detection of the first sensor 261, the servo control unit 20 will issue a first control signal and a second control signal for directing the rotation of those light emitters 210 and image sensors 22, that is, the light emitters 210 are rotate to project light beams toward the back of the automobile and thus the display device will review images of the back of the automobile as signals received by the image sensors 22 are reflected back from the back of the automobile. In addition, when the automobile is turning, the servo control unit 20 can also control those light emitters 210 and image sensors 22 to rotate according to the turn so as to eliminate blind spots. For instance, while parking at curb, the light emitters and image sensors are orientated to observe the two sides, the lower portion and the back of the automobile, so that images displayed on the display device can be used as reference for parking.

As for the whitening effect, it can be reduced through the adjustment of the orientation of image sensors 22 according to the second control signal issued by the servo control unit 20 while the servo control unit is processing the signal detected by the infrared sensor 2622 of the second sensor 2622, or by employing image signal of another image sensor 22. In addition, the whitening effect can be eliminated by adjusting the gains of relating image sensors.

It is noted that the arrangement of the light emitters and image sensors is not limited by that shown in FIG. 4A, they can be arranged at any location of the transportation means at will that is helpful to the driver of the transportation means. Furthermore, at least one of the plural light emitters and at least one of the plural image sensors are fitted into a same module, whereas the module can be arranged at a location selected form the group consisting of: the front, the left front side, the right front side, the rear and the top of the transportation means.

While the preferred embodiment of the invention has been set forth for the purpose of disclosure, modifications of the disclosed embodiment of the invention as well as other embodiments thereof may occur to those skilled in the art. Accordingly, the appended claims are intended to cover all embodiments which do not depart from the spirit and scope of the invention.

What is claimed is:

1. An assistant monitor method for vehicles, comprising steps of:
   projecting a light beam to illuminate objects surrounding a transportation means;
   receiving the reflected light of the light beam so as to generate an image-related signal accordingly;
   generating a status signal by performing a detection operation to sense the status of the transportation means;
   processing the status signal so as to correspondingly generate a control signal; and
   adjusting the projecting angle and intensity of the light beam and the angle of reception for receiving the reflection of the light beam according to the control signal.

2. The method of claim 1, wherein the detection operation further comprises a step of:
   detecting a moving condition of the transportation means, while the moving condition is a status selected from the group consisting of: turning of the transportation means, moving direction of the transportation means, speed of the transportation means, and the combination thereof.

3. The method of claim 1, wherein the detection operation further comprises a step of:
   detecting of the ambient luminance of the transportation means.

4. The method of claim 3, further comprising a step of:
   detecting statuses of invisible light illuminating the ambient of the transportation means while using the result of the detection as a basis for evaluating the influence of whitening effect.

5. The method of claim 4, wherein a sensor used for detection the invisible light is an infrared sensor.

6. The method of claim 1, further comprising a step of:
   processing the image-related signal to generate an image signal while adjusting the gain of the image signal accordingly.

7. The method of claim 1, comprising a step of:
   enabling a display device to receive the image signal for displaying images thereon accordingly.

8. The method of claim 1, wherein the light beam illuminating objects surrounding the transportation means is a light beam selected form the group consisting of: visible light, infrared light and the combination thereof.

9. The method of claim 1, wherein a device used for receiving the reflection of the light beam and thus used as image sensor is a device selected form the group consisting of: a charge coupled device (CCD), and a complementary metal oxide semiconductor (CMOS).

10. An assistant monitor apparatus, adapted to be arranged on a transportation means, comprising:
   at least a light emitter, each for providing a light beam;
   at least an image sensor, each capable of receiving the reflection of the light beams and thus generating an image-related signal accordingly;
   at least a sensing controller, each capable of detecting a status of the transportation means and thus generating a status signal accordingly;
   a servo control unit, coupled to each image sensor and each sensing controller, capable of processing the image-related signal of each image sensor to generate an image signal correspondingly while processing the status signal of each sensing controller to generate a control signal correspondingly;
   at least a swivel seat, coupled to the servo controller unit, capable of receiving the control signal while controlling the swivel seat to rotate according to the received control signal; and
   a display device, coupled to the servo controller unit, capable of receiving the image signal while display an image thereon accordingly.

11. The apparatus of claim 10, wherein the light emitter is a light source selected from the group consisting of a light source of visible light and a light source of infrared light.

12. The apparatus of claim 10, wherein the light emitter further comprises a screen, while the screen is a device selected form the group consisting of: a parabolic reflector, and a scattering screen.

13. The apparatus of claim 10, wherein the image sensor is a device selected from the group consisting of: a visible light sensor, an infrared light sensor, a sensor capable sensing visible light and infrared light, and a device integrating a visible light sensor and an infrared light sensor.

14. The apparatus of claim 10, wherein the image sensor is arranged at a location selected form the group consisting of: the front, the left front side, the right front side, the rear and the top of the transportation means.

15. The apparatus of claim 10, wherein the status of the transportation means is a status selected from the group consisting of: a turning of the transportation means, moving direction of the transportation means, speed of the transportation means, and the combination thereof.

16. The apparatus of claim 10, wherein the sensing controller is capable of detecting a variation of the steering mechanism of the transportation means as the transportation, means is turning.

17. The apparatus of claim 10, wherein each swivel seat is at least connected to a device selected from the group consisting of the light emitters and the image sensors, while being affixed to the transportation means for enabling the device connected to the swivel seat to rotate to a direction corresponding to the status of the transportation means according to the control signal of the servo control unit.

18. The apparatus of claim 10, wherein the sensing controller is capable of generating a status signal according to the ambient luminance of the transportation means detected thereby, while transmitting the status signal to the servo control unit for enabling the same to generate a corresponding control signal controlling the intensity of the light projected by the light emitters.

19. The apparatus of claim 10, wherein at least one of the light emitters and at least one of the image sensors can be configured into a module.

20. The apparatus of claim 10, wherein the module is arranged at a location selected form the group consisting of: the front, the left front side, the right front side, the rear and the top of the transportation means.

* * * * *